METHOD AND APPARATUS FOR CONSTRUCTING A MAGNETIC CORE

Filed Sept. 19, 1955 5 Sheets-Sheet 1

INVENTORS.
John J. Zimsky
William A. Mocker
George N. Boyd
BY Lee H. Kaiser
Attorney INVENTORS.
John J. Zimsky
William A. Mocker
George N. Boyd
BY Lee H. Kaiser
Attorney

METHOD AND APPARATUS FOR CONSTRUCTING A MAGNETIC CORE

Filed Sept. 19, 1955

INVENTORS.
John J. Zimsky
William A. Mocker
George N. Boyd
BY Lee H. Kaiser
Attorney

METHOD AND APPARATUS FOR CONSTRUCTING A MAGNETIC CORE

Filed Sept. 19, 1955

INVENTORS.
John J. Zimsky
William A. Mocker
George N. Boyd
BY Lee H. Kaiser
Attorney Oct. 10, 1961 J. J. ZIMSKY ET AL 3,003,225

METHOD AND APPARATUS FOR CONSTRUCTING A MAGNETIC CORE

Filed Sept. 19, 1955 5 Sheets-Sheet 5

INVENTORS.
John J. Zimsky
William A. Mocker
George N. Boyd
BY Lee H. Kaiser
Attorney United States Patent Office 3,003,225
Patented Oct. 10, 1961

3,003,225

METHOD AND APPARATUS FOR CONSTRUCTING A MAGNETIC CORE

John J. Zimsky and William A. Mocker, Bridgeville, and George N. Boyd, Pittsburgh, Pa., assignors to McGraw-Edison Company, a corporation of Delaware Filed Sept. 19, 1955, Ser. No. 535,202
19 Claims. (Cl. 29—155.61)

This invention relates to magnetic cores for stationary induction apparatus and in particular to magnetic cores of individual closed magnetic circuits each comprising one or more laminations and having a single lap joint therein, to their method of construction, and to apparatus for shaping the laminations to desired contour.

The magnetic core of the present invention is an improvement over the core disclosed in U.S. Patent 2,614,-158 to Sefton et al. and its method of construction is an improvement over the process disclosed in U.S. Patent 2,613,430 to Sefton et al., both patents having the same assignee as the present invention. In the method covered by the 2,613,430 patent magnetic strip material is spirally wound on a trapezoidal mandrel to form a closed core, spacers are inserted between selected turns during the winding, a cut is made through the core side having the spacers, and before annealing the laminations are stacked into a generally rectangular core with the respective ends of each closed magnetic circuit comprising at least one lamination in overlapping relation. This method provides a core which has remarkably low exciting current and core loss in comparison to other commercially available cores. However, magnetic cores constructed in accordance with this prior art method are not absolutely uniform in weight, shape, and magnetic characteristics, and further, the method involves some scrap loss of magnetic strip material. In this prior art method the spiral winding is continued until a predetermined thickness of magnetic strip is attained, and variations in tension on the strip during winding may cause variation in weight up to fifteen pounds in a magnetic core having a nominal weight of approximately one hundred pounds. When it is necessary to splice the ends of the reels of magnetic strip material, the lamination containing the splice must be discarded, giving rise to scrap. Further, the operation of cutting through a closed core is both difficult and expensive and necessitates frequent replacement of the comparatively expensive abrasive cutting wheels.

It is an object of the invention to provide magnetic cores which are substantially uniform in weight, shape, and electrical characteristics. It is a further object of the invention to provide magnetic cores having these uniform characteristics and comprised of whole turn laminations having a lap joint therein and provided with locating means which effect symmetry of the lap joints relative to a medial plane through the core.

Another object of the invention is to provide a method of constructing magnetic cores which are substantially uniform in shape, weight, and electrical characteristics.

A further object of the invention is to provide a method of constructing magnetic cores which involves less scrap than the method of the aforementioned Patent 2,613,430 to Sefton et al.

A still further object of the invention is to provide a method of constructing such magnetic cores which obviates the necessity of cutting through the core.

The efficiency of a method of magnetic core construction can be evaluated by a quantity termed "destruction factor" which is a measure of the amount of deterioration of grain structure due to cold working and handling of the magnetic strip laminations. Destruction factor is the difference between the power consumption in electrical steel when subjected to alternating magnetization, i.e., core loss, when measured initially in an Epstein test of samples of strain-relief annealed magnetic material and after final stacking of flatwise bent laminations of such magnetic material in the core and coil assembly. It will be appreciated that the lower the destruction factor introduced by a method of core construction, the higher magnetic flux densities the steel of the core can be operated at, and consequently, the smaller amount of core steel will be required to permit operation of the core at a given magnetic flux density.

It is a still further object of the invention to provide a method of magnetic core construction which has considerably lower destruction factor than the method of the aforementioned Patent 2,613,430 and other known methods of constructing magnetic cores having individual closed magnetic turns.

In accordance with the method of the present invention magnetic strip material is cut to provide a plurality of magnetic strip laminations of progressively different lengths, the laminations are superimposed in a bundle, and the stack of laminations is bent flatwise through obtuse angles at points corresponding to the corners of the finished core to provide a set in at least the laminations at the inside of the bends. The laminations are then concentrically stacked into a closed hollow core of individual closed magnetic circuits each comprising at least one lamination with the set corner bends generally in alignment and the respective ends of each closed magnetic circuit in overlapping relation to one another. In the preferred species of the method, each closed magnetic circuit comprises an individual whole turn lamination, and the core is constructed by securing the ends of the peripherally longest lamination in overlapping relation and assemblying the laminations successively in order of their progressively differene lengths within said longest lamination and with the respective ends of each lamination in overlapping relation and the lap joints of said laminations in alignment along one side of the core. The closed hollow core is then shaped to its final rectangular configuration and strain-relief annealed while so shaped. In the preferred species of the method of the invention, the closed hollow core is expanded by mechanical force into rectangular configuration by applying pressure radially outward against the inner periphery of the side containing the lap joints and against the side diametrically opposite thereto.

Uniformity of weight, shape, and magnetic characteristics and the symmetry of the lap joints of a core constructed in accordance with the method of the present invention is partly attributable to the step of cold forming a stack of laminations to provide bends at the portions corresponding to the corners of the finished core, and it is an object of the invention to provide novel apparatus for forming such corner bends in the stack of laminations.

In the steps of the preferred embodiment involving the cold forming of bends in the stack at points corresponding to the corners of the finished core, the stack of laminations is bent flatwise in conformity with the contour of a mandrel approximately the size of the window of the finished core and having opposed concave sides and opposed relatively shorter sides and having acute angle corners between the sides. Because of the resilience of the thin magnetic strip material, it is necessary to bend the material through an obtuse angle to effect a right angle bend therein, and the acute angle corners of the mandrel permit flatwise bending of the stack through obtuse angles when the stack is formed in embracing relationship to the mandrel. The novel apparatus includes a plurality of pressure applying means for applying pressure on the stack in a direction toward the mandrel. The mandrel and one pressure applying means are movable relative to each other in a direction longitudinally of the mandrel to permit bending the stack of laminations in U-shape around the mandrel and adjacent the concave sides thereof. Other pressure applying means and the mandrel are movable relative to each other in a direction perpendicular to the longitudinal axis of the mandrel to permit bending of the stack in conformity with the concave sides and also to permit bending the ends of the stack in embracing relation to one of the shorter sides of the mandrel.

These and other objects of the invention will become more apparent upon consideration of the following detailed description when taken in conjunction with the accompanying drawing wherein.

Figure 13:
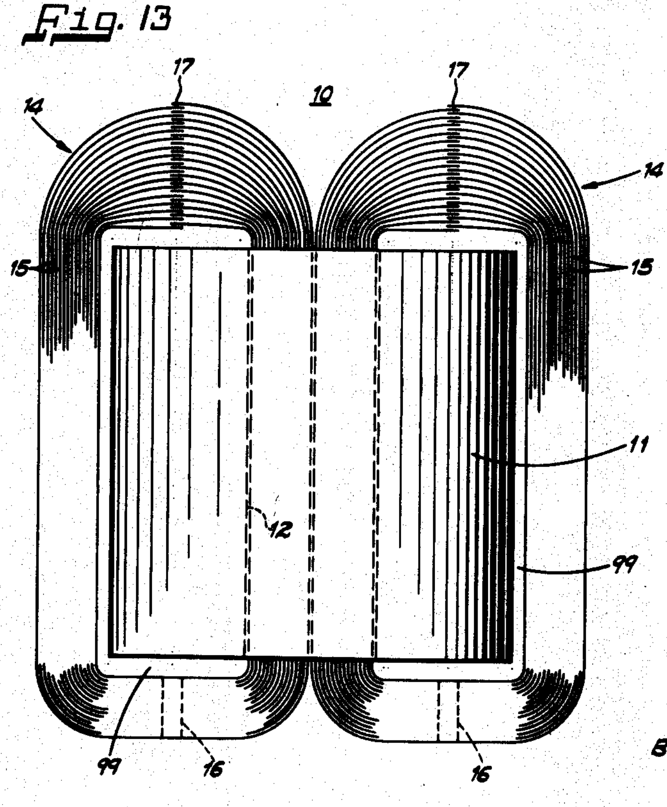
FIG. 13 shows a stationary induction apparatus employing two magnetic cores constructed in accordance with the invention.

The magnetic core of the invention comprises a plurality of concentrically nested individual closed magnetic circuits each having a single lap joint therein, and in the preferred embodiment illustrated in FIG. 13 each closed magnetic circuit comprises a single whole turn lamination with the respective ends thereof in overlapping relation. However, alternative embodiments with magnetic characteristics substantially equal to those of the preferred construction have been constructed wherein each closed magnetic circuit comprises a plurality of laminations, termed a section, and the respective ends of each section are overlapped. Hereinafter in the specification and in the appended claims the phrase "whole turn" is intended to be synonymous with "closed magnetic circuit" and to cover both individual laminations with the respective ends thereof overlapping one another and sections each comprising a plurality of laminations with the respective ends of each section in overlapping relation. Further, "lamination length" is intended to be generic to both a single lamination and to a plurality of superimposed laminations of substantially the same length.

Figure 1:
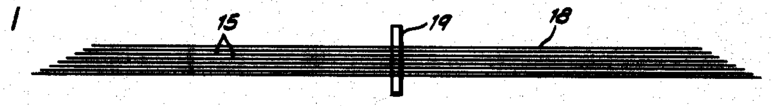
FIG. 1 is a plan view of a stack of magnetic strip laminations cut to progressively different lengths.
Figure 2:
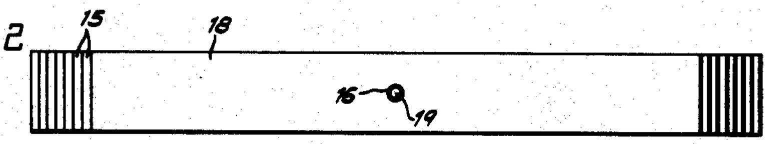
FIG. 2 is an elevation view of the stack of laminations of FIG. 1.
Figure 3:
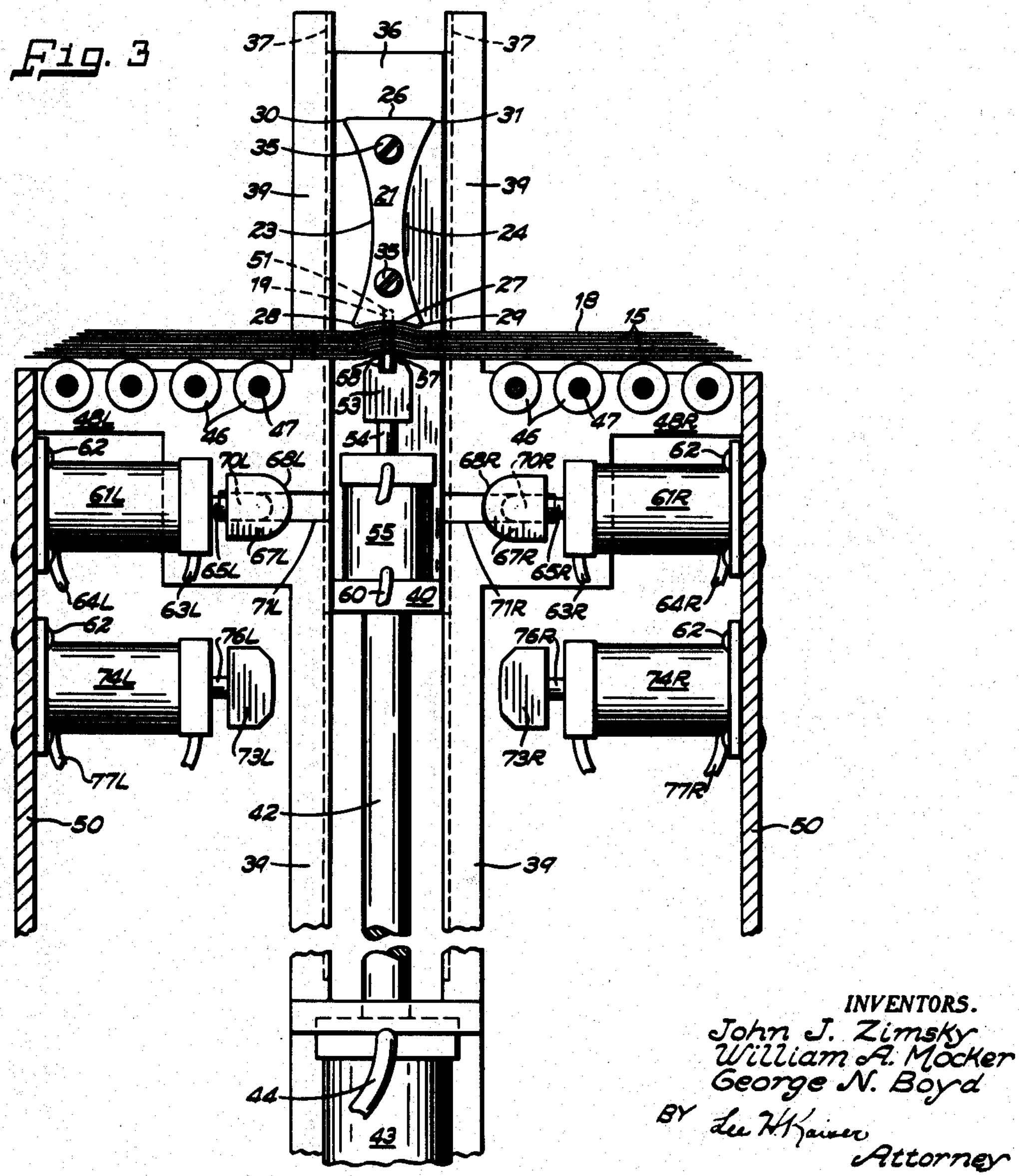
FIG. 3 is an elevation view of novel apparatus for cold forming bends in the stack of laminations of FIG. 1 at points corresponding to the corners of the finished core.

FIG. 13 illustrates a single phase, shell type distribution transformer 10 including a preformed electrical winding 11 having a window 12 therein for receiving a winding leg of each of two substantially rectangular, closed magnetic cores 14 in accordance with the present invention and having the longer sides thereof in abutting relation. Each core 14 includes a plurality of concentrically stacked, flatwise curved magnetic strip laminations 15 each having a single lap joint 17 therein and being permanently set in approximately rectangular configuration. The laminations 15 at the inner periphery of each finished core 14 have a predetermined length and the laminations 15 become progressively longer toward the outer periphery of the core. To provide a plurality of magnetic strip laminations 15 of progressively different lengths, magnetic strip material, preferably cold rolled silicon steel having a preferred grain orientation lengthwise thereof may be measured out and cut to length by hand, it may be spirally wound flatwise on a mandrel to form a convoluted loop and a cut made radially through one side of the loop in the manner disclosed in the aforementioned U.S. Patent 2,613,430 to Sefton et al., or preferably the magnetic strip material is cut to progressively increasing lengths on a suitable index ratio shearing device. Laminations 15 cut on an index ratio shearing device progressively increase in length by an amount proportional to lamination thickness which is accurately held to a variation of less than .005 of an inch, and this accurate progression facilitates the construction of magnetic cores of uniform shape and weight and symmetrically arranged lap joints. Such an index shearing device and the manner of cutting magnetic strip material to progressively different lengths is well known in the art and does not constitute a part of the present invention and illustration thereof has been omitted from the drawing. Each lamination 15 is provided with centering means, preferably a locating hole 16 punched midway of the ends thereof, the punching operation preferably being performed simultaneously with the shearing of the laminations 15 to length. As shown in FIGS. 1 and 2, the laminations 15 are superimposed in order of their progressively different lengths in a stack 18 with the locating holes 16 in all of the laminations 15 in register, and a locating pin 19 is inserted through the aligned locating holes 16.

The stack 18 of laminations 15 is then cold formed as a unit to provide bends in at least certain of the laminations at the places corresponding to the corners of the finished core. Preferably, the laminations 15 are of cold rolled, approximately .014 inch thick silicon steel which is relatively resilient, and to cold form a permanent set in the laminations 15 it is necessary to deflect the stack 18 of laminations 15 through an obtuse angle even when a small radius of bend is utilized. Although the bending of the stack 18 of laminations 15 through obtuse angles may be performed manually, in the preferred embodiment of the method of the invention four bends of the stack 18 through obtuse angles are accomplished at the places corresponding to the corners of the finished core in the novel apparatus illustrated in FIGS. 3 to 6. In order to cold form the stack 18 into a closed rectangular core having bends at the corners thereof, the stack 18 of laminations 15 is bent in conformity with the contour of an elongated, quadrilateral mandrel 21 having a pair of opposed concave sides 23 and 24 and a pair of opposed relatively shorter sides 26 and 27 and having acute angle corners 28, 29, 30 and 31 between the sides thereof. The mandrel 21 is rigidly secured by screws 35 to a vertically reciprocable backing plate 36 adapted to slide longitudinally within guideways 37 provided in guide posts 39 shown disposed in a vertical position, although it will be apparent that the apparatus of the invention may be operated in any desired position. The lower end of the backing plate 36 is rigidly affixed to a transverse member 40 that is secured to the piston rod 42 of a piston (not shown) which is slidable within a main fluid cylinder 43. The main cylinder 43 may be either of the pneumatic or hydraulic type, and admission of fluid under pressure through fluid supply line 44 into the upper end of cylinder 43 moves piston rod 42, mandrel 21, transverse member 40, and the backing plate 36 simultaneously downward. Similarly these members are actuated vertically upward when fluid under pressure is admitted through a fluid supply line (not shown) into the lower end of main cylinder 43.

A plurality of rollers 46 rotatably supported upon horizontally extending pins 47 are disposed in a common plane and provide a horizontal platform for the stack 18 of laminations 15. Vertical support plates 48L and 48R disposed on opposite sides of the longitudinal axis of mandrel 21 each carry one half of the pins 47. In order to simplify the drawing, the structural elements for supporting the plates 48L and 48R have been omitted and it is represented that each vertical support plate 48 at one end is integral with a guide post 39 and at the opposite end is affixed to a vertical abutment 50. The support rollers 46 are in a vertical plane with the mandrel 21. Fluid under pressure is admitted through fluid supply line 44 into the upper end of main cylinder 43 to move piston rod 42 downward until the shorter side 27 at the bottom of mandrel 21 is contiguous the shortest lamination 15 at the top of stack 18. The shorter side 26 at the top of mandrel 21 is flat, whereas the shorter side 27 at the bottom of mandrel 21 is concave and is provided with an aperture 51 adapted to accommodate the locating pin 19 protruding through the stack 18 of laminations 15.

A pressure applying shoe 53 opposite the concave shorter side 27 of mandrel 21 is secured to the piston rod 54 of a fluid cylinder 55 supported on the transverse member 40 with its axis disposed vertically. The upper surface 57 of pressure applying shoe 53 opposite concave shorter side 27 is curved and provided with a horizontally extending slot 58 for receiving the lower end of the locating pin 19. Admission of fluid under pressure through fluid supply line 60 into the lower end of cylinder 55 raises piston rod 54 and pressure applying shoe 53, thereby bending the stack 18 of laminations 15 in conformity with the concave shorter side 27 of mandrel 21.

The next step in bending the stack 18 of laminations 15 through obtuse angles at places corresponding to the four corners of the finished core is to apply pressure against the stack 18 in a direction generally parallel to the longitudinal axis of the mandrel 21 to flatwise bend the stack 18 into U-shape about mandrel 21 and laterally of the concave sides 23 and 24 thereof. A pair of fluid cylinders 61L and 61R disposed laterally of and on opposite sides of the longitudinal axis of the mandrel 21 are supported by suitable means such as rivets 62 on the abutments 50 with their axes horizontal. The fluid cylinders 61L and 61R are identical and only one will be described. Fluid cylinder 61R has a piston (not shown) adapted to reciprocably slide therein when fluid under pressure is admitted into one or the other end of the cylinder through fluid supply lines 63R or 64R, a piston rod 65R affixed to the piston, and a shoe 67R having an arcuate pressure applying face 68R and secured to the piston rod 65R. The shoe 67R is supported against vertical movement by an elongated support bar 70R affixed to a side face of shoe 67R and extending into and slidably reciprocable within a horizontally extending groove 71R in the support plate 48R.

Figure 4:
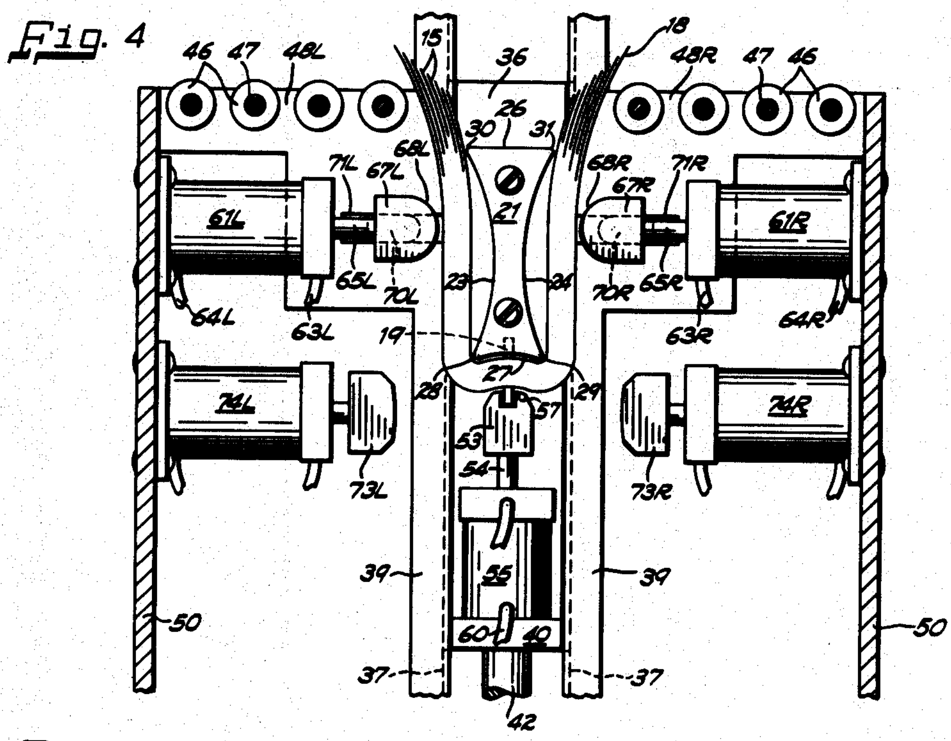
FIGS. 4 to 6 illustrate successive operations of the apparatus of FIG. 3 in cold forming the stack of laminations to approximate rectangular shape.

Admission of fluid under pressure through fluid supply line 44 into the upper end of main cylinder 43 moves piston rod 42, backing plate 36, fluid cylinder 55, and mandrel 21 simultaneously downward, thereby urging the stack 18 of laminations 15 downwardly against the rollers 46 disposed closest to the longitudinal axis of mandrel 21. As the mandrel 21 is moved downward pulling the central portion of the stack 18, which is held in conformity with concave shorter side 27, below the upper surface of the rollers 46 while the ends of the stack 18 are supported on the rollers 46, the stack 18 is gradually bent into approximate V-shape. When the mandrel 21 is moved downward, the reaction of the rollers 46 against the stack 18 is in a direction toward mandrel 21. The pressure applying shoes 67L and 67R are moved by admission of fluid under pressure into fluid cylinders 61L and 61R to a position closer to the longitudinal axis of mandrel 21 than the inner ones of the rollers 46 and in which position the crown of the arcuate faces 68L and 68R of pressure applying shoes 67L and 67R is disposed laterally of the acute angle lower corners 28 and 29 of the mandrel 21 by a distance only slightly greater than the thickness of the stack 18. In moving further downward the mandrel 21 pushes the central portion of the stack 18 below the shoes 67L and 67R and pulls the extremities of the stack 18 past the rollers 46 and the shoes 67L and 67R as illustrated in FIG. 4, thereby effecting substantially right angle bends of the stack 18 of laminations 15 around the lower acute angle corners 28 and 29 of the mandrel 21. In this position of the mandrel 21 the stack 18 of laminations 15 is bent laterally of the opposed concave sides 23 and 24 of the mandrel 21 and into approximately U-shape.

Figure 5:
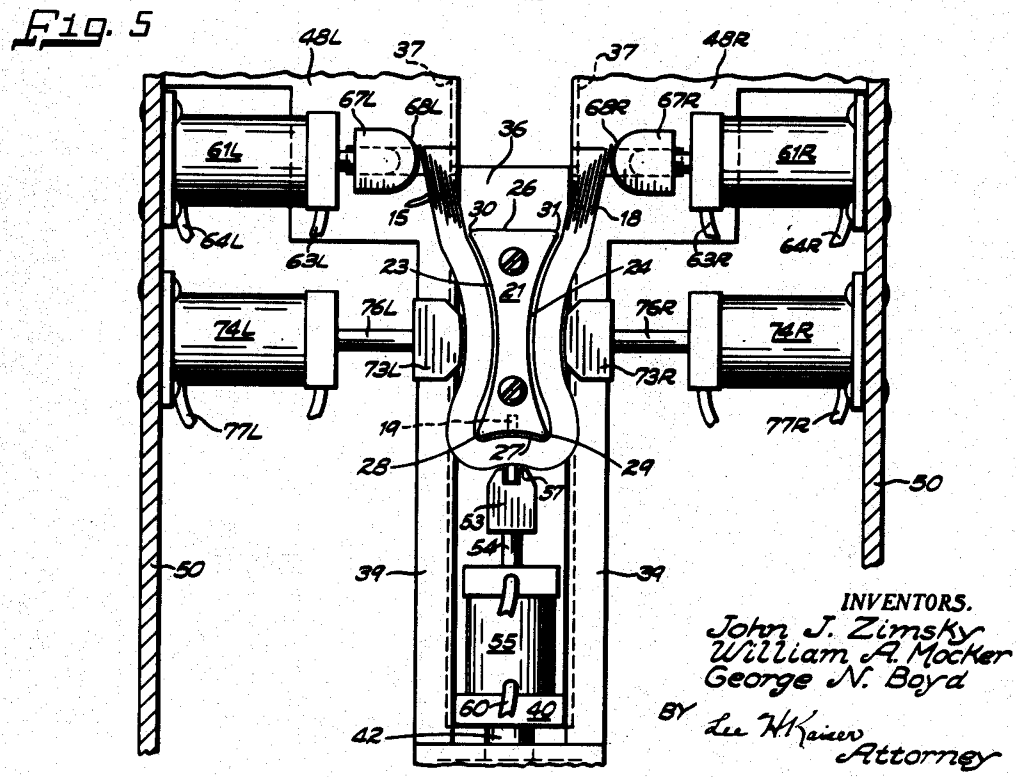

Fluid under pressure is admitted through fluid supply line 44 into the upper end of main cylinder 43 until the mandrel 21 reaches approximately the position shown in FIG. 5 where the free ends of the stack 18 of laminations 15 are opposite the pressure applying shoes 67L and 67R. In this position the opposed concave sides 23 and 24 of mandrel 21 are opposite the pressure applying shoes 73L and 73R of a pair of fluid cylinders 74L and 74R disposed laterally of and on opposite sides of the longitudinal axis of the mandrel 21 and rigidly secured by suitable means such as rivets 62 to the abutments 50. The fluid cylinders 74L and 74R are identical and only one will be described. The pressure applying shoe 73R is secured to the piston rod 76R of a piston (not shown) adapted to slidably reciprocate within fluid cylinder 74R to move pressure applying shoe 73R relative to mandrel 21 in a direction perpendicular to the longitudinal axis thereof. Admission of fluid under pressure through fluid supply lines 77L and 77R into the outer end of fluid cylinders 74L and 74R moves shoes 73L and 73R in a direction to bend the stack 18 of laminations 15 in conformity with opposed concave sides 23 and 24 of mandrel 21. It will be appreciated that forcing the stack 18 into conformity with the opposed concave sides 23 and 24 flatwise bends the stack 18 of laminations through an obtuse angle at the lower acute angle corners 28 and 29 of the mandrel 21, and the acute angles at the corners 28 and 29 are so chosen that at least the laminations at the inner portion of the bend are formed sufficiently beyond the elastic limit and beyond ninety degrees that the permanent bends 78L and 78R (see FIG. 7) therein are approximately right angles.

Figure 6:
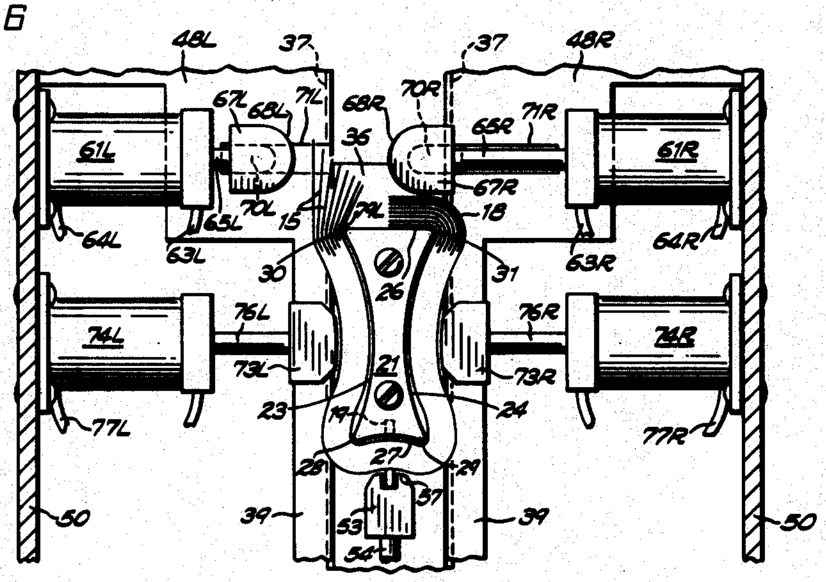
Figure 8:
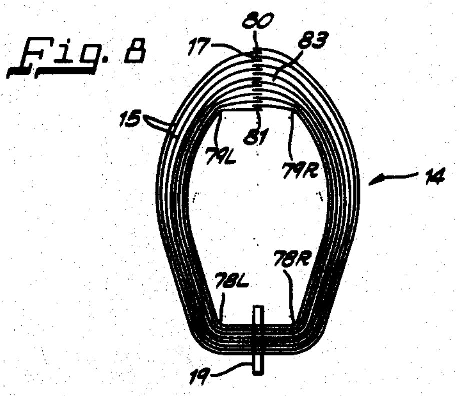
FIG. 8 illustrates the step of concentrically stacking the laminations to form a closed hollow core with the respective ends of each lamination in overlapping relation to one another along one side of the core.

The length of the flat shorter side 26 of mandrel 21 is approximately equal to the dimension between the inside surfaces of the winding legs of the finished core 14. Fluid under pressure is admitted alternately through the supply lines 64L and 64R leading to the outer end of the fluid cylinders 61L and 61R to alternately move the pressure applying shoes 67L and 67R relative to the mandrel 21 and perpendicular to the longitudinal axis thereof and thus bend the free ends of the stack 18 in conformity with the flat shorter side 26 of mandrel 21. As illustrated in FIG. 6 the left hand shoe 67L has already been moved forward to deflect the free end of the stack 18 into conformity with flat shorter side 26 and has been retracted. In moving forward left hand shoe 67L has bent the stack 18 around the acute angle upper left hand corner 30 of mandrel 21 resulting in a permanent set 79L in at least the laminations 15 at the inside of the bend. Further, as illustrated in FIG. 6 fluid under pressure has been admitted into the outer end of cylinder 61R, causing pressure applying shoe 67R to move relative to mandrel 21 and perpendicular to the axis thereof to bend the stack 18 around the acute angle upper right hand corner 31 of mandrel 21. It has been found that the subsequent operation of stacking laminations having corner bends formed therein is facilitated if the bends 79L and 79R at the upper corners of the laminations 15 are somewhat less than ninety degrees. The provision of right angle bends at the upper corners 79L and 79R causes the overlapped ends of the radially innermost laminations 15 to dip below the horizontal, i.e., below the layer including this lamination, when the laminations are concentrically stacked as illustrated in FIG. 8, and this complicates the operation of shaping the core to rectangular configuration. Consequently, the acute angle of the upper corners 30 and 31 of mandrel 21 is selected so that the corner bends 79L and 79R are somewhat less than right angles.

Figure 7:
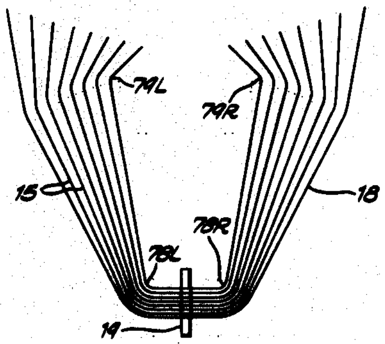
FIG. 7 illustrates the stack of laminations after the corner bends have been cold formed therein in the operations illustrated in FIGS. 3 through 6.

The height of mandrel 21 is somewhat less than the height of the window of the finished core to permit holding the stack 18 of laminations 15 in conformity with the opposed concave sides 23 and 24 while cold forming the corner bends 78 and 79. A stack 18 of laminations 15 having corner bends 78 and 79 cold formed therein on the apparatus of FIGS. 3 through 6 is illustrated in FIG. 7 wherein it is represented that the angle of the permanently set corner bends 78 and 79 is greater in the laminations 15 at the inside of the bends than in the laminations on the outside of the bend. It will be appreciated that it is impossible to accurately represent the actual angles cold formed at the corners of all the laminations 15 of a core 14 which conventionally has approximately seventy-two .014 inch thick laminations per inch of core thickness.

The ends of the laminations 15 are then overlapped to form a closed core, and in the preferred species of the method the ends of the longest lamination 15 are secured together in overlapping relation, preferably by rivets 80 as shown in FIG. 8, and the laminations 15 are inserted consecutively in order of their progressively decreasing length within the closed longest lamination 15 and with the respective ends of each lamination 15 in overlapping relation. If desired, the laminations 15 can be concentrically stacked in this manner in sections each a plurality of laminations thick and the respective ends of each section overlapped. In concentrically stacking the laminations 15, the locating pin 19 is inserted through the locating hole 16 in the longest lamination 15, and each lamination 15 is inserted within the next longest lamination 15 with the locating hole 15 therein receiving the locating pin 19 and the corresponding corner bends 78 and 79 in all of the laminations 15 nested together in approximate alignment. If desired the ends of the shortest lamination 15 are secured together in overlapping relation by rivets 81.

Figure 9:
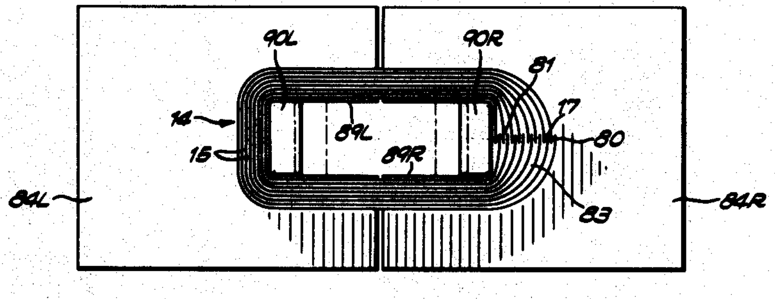
FIGS. 9 and 10 are plan and vertical section views respectively of apparatus which may be used to accomplish the step of mechanically expanding the closed hollow core to rectangular shape.
Figure 10:
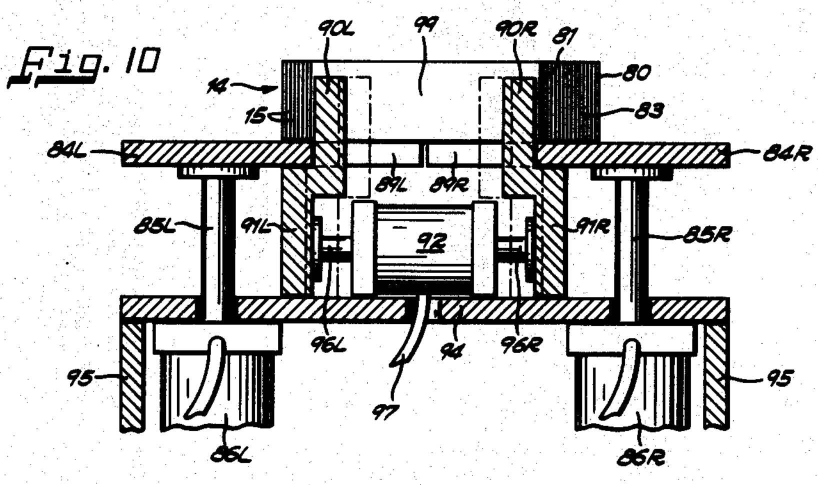

The closed convoluted core 14 comprising laminations 15 having the ends thereof in overlapping relation is then expanded by mechanical force into rectangular configuration. In the preferred embodiment of the method pressure is applied radially outward in diametrically opposite directions against the side 83 of the core 14 containing the lap joints 17 and against the side diametrically opposite thereto to shape the core 14 into rectangular contour. Although the mechanical force to expand the core 14 can be obtained by the use of an expansible mandrel in a manner well known in the art, it is preferable to accomplish this operation in the apparatus shown in FIGS. 9 through 11 which includes a table formed by two horizontal plates 84L and 84R. The plates 84L and 84R are carried upon the piston rods 85L and 85R of fluid cylinders 86L and 86R having their axes disposed vertically. Pressure applying posts 90L and 90R for mechanically expanding core 14 extend through rectangular slots 89L and 89R provided in plates 84L and 84R. Beneath plate 84 each post 90 has an offset portion 91. The offset portions 91L and 91R of the posts 90L and 90R and a fluid cylinder 92 positioned with its axis disposed horizontally rest upon a horizontal member 94 which is supported upon abutments 95. The fluid cylinder 92 includes two pistons (not shown) integral with piston rods 96L and 96R and reciprocably slidable within cylinder 92 in an outward direction when fluid under pressure is admitted through fluid supply line 97 into cylinder 92 between the pistons. Piston rods 96L and 96R are affixed to the offset portions 91L and 91R of pressure applying posts 90L and 90R. When fluid under pressure is admitted through supply line 97 into cylinder 92, the pressure applying posts 90L and 90R are slidable within the rectangular slots 89L and 89R in the plates 84L and 84R from an inner position shown in dash-dot lines in FIGS. 9 and 10 to an outer position shown in full lines.

When the pressure applying posts 90L and 90 R are in the inner position shown in dot-dash lines, the closed core 14 with the ends of the laminations 15 in overlapping relation is rested upon the table formed by plates 84L and 84R with the posts 90L and 90R extending into the window 99 of the core 14 and one post 90R opposite the core side 83 containing the lap joints 17 and the other post 90L facing the core side diametrically opposite thereto. Admission of fluid under pressure through fluid supply line 97 into fluid cylinder 92 forces both piston rods 96L and 96R outward to move the posts 90L and 90R into the position shown in full lines and thus expand the closed core 14 by mechanical force into rectangular shape. It will be appreciated that the apparatus will operate equally well if one pressure applying post 90 is stationary and only one pressure applying post 90 is movable.

Figure 11:
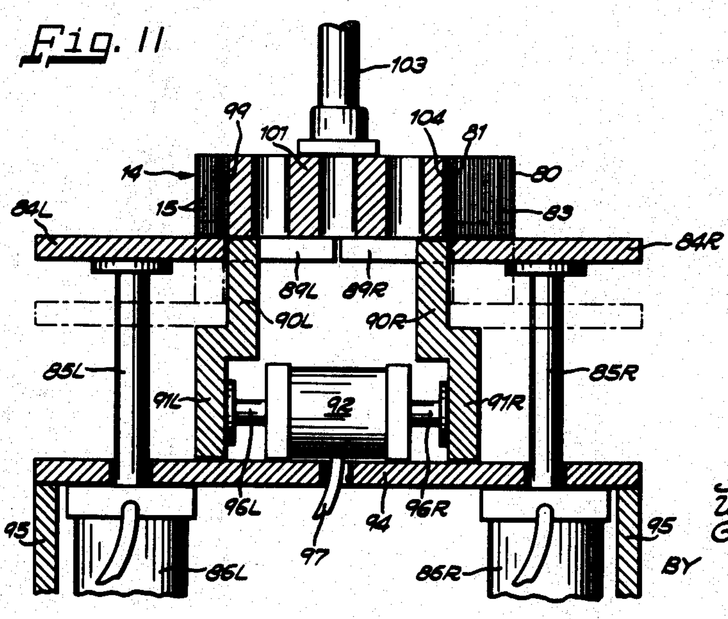
FIG. 11 illustrates how the apparatus shown in FIGS. 9 and 10 may be used to insert an annealing mandrel within the expanded rectangular core.

As illustrated in FIG. 11 an annealing mandrel 101 having the contour of the window of the finished core 14 is positioned above the posts 90L and 90R and in register with the window 99 of the expanded rectangular core 14, a stop 103 is disposed above the mandrel 101 to prevent upward movement of the annealing mandrel 101, and fluid under pressure is simultaneously admitted through fluid supply lines (not shown) into the lower end of both fluid cylinders 86L and 86R to move piston rods 85L and 85R and plates 84L and 84R upward. Simultaneous upward movement of the plates 84L and 84R lifts the closed rectangular core 14 relative to the annealing mandrel 101, which is prevented from moving upward by the stop 103, and forces the annealing mandrel 101 into the window 99 of the closed core 14. A vertical slot 104 is provided in the shorter side of the mandrel 101 opposite the core side 83 containing the lap joints to receive the rivets 81 securing the ends of the shortest lamination 15 and thus permit the mandrel 101 to slide without obstruction into the window 99 of the closed rectangular core 14.

Figure 12:
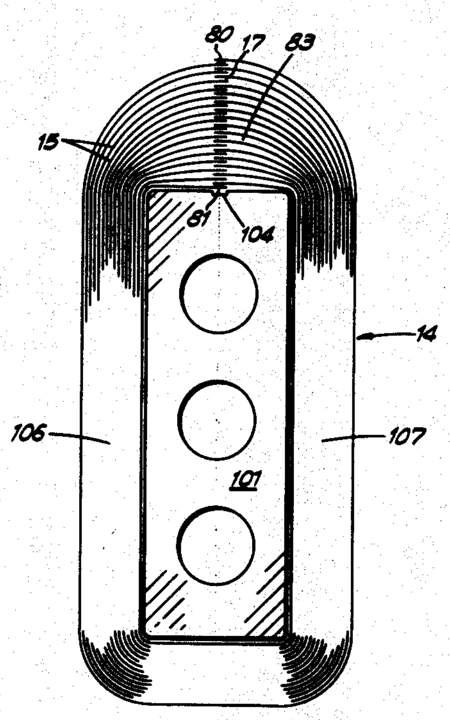
FIG. 12 illustrates the rectangular core embracing an annealing mandrel within the winding window thereof.

FIG. 12 illustrates a closed core 14 shaped to rectangular configuration and embracing an annealing mandrel 101. Again the hundreds of laminations 15 in a core 14 makes it impracticable to accurately represent the contour of the laminations 15 at the side 83 containing the lap joints 17. The magnetic core 14 having the annealing mandrel 101 within the window 99 thereof is then given a strain relief anneal to remove deleterious strains in the magnetic material introduced by forming the laminations 15 to approximate rectangular shape and to permanently set the laminations 15 in rectangular shape. After the annealing operation the rivets 80 and 81 securing the ends of the outermost and innermost laminations 15 are removed. Either of the sides 106 and 107 of the core 14 adjoining the side 83 containing the lap joints 17 may form a winding leg for a preformed electrical winding.

A single phase shell type transformer 10 having a preformed electrical winding 11 assembled with two abutting magnetic cores 14 constructed in accordance with the present invention is illustrated in FIG. 13. The preformed electrical coil 11 contains both primary and secondary windings and is provided with a window 12 for the reception of a winding leg of each of the cores 14. The laminations 15 assume a permanent set during the annealing and retain their contour in the finished core substantially without constraint.

The lapped ends of the laminations 15 are opened up slightly, and the laminations are inserted through the window 12 of the preformed electrical winding 11 in the manner disclosed in the aforementioned U.S. Patent 2,613,430 to Sefton et al. Slight bending of the yokes is necessary to permit this insertion but the deformation does not exceed the elastic limit so that the magnetic properties of the silicon steel are not impaired. When the open ends of the laminations 15 have been passed entirely through the window 12 in the electrical winding 11, they are brought together and the respective ends of each lamination 15 are restored to the overlapping position in which they were annealed. The laminations 15 are inserted through the window 12 and restacked successively beginning with the innermost lamination 15 in order of increasing length about a leg of the electrical winding 11, and for economy in construction a plurality of laminations 15 are inserted simultaneously through the coil window 12 and the ends restored to their previous overlapping relation. Thus the laminations 15 are assembled to the electrical winding 11 in the same relative position they had during annealing, and each lamination 15 has its original size and shape and is substantially free of strains deleterious to its magnetic properties and further has a permanent set to retain its operative configuration substantially without contraint. After the laminations 15 of the first core 14 have been concentrically stacked about a leg of the electrical winding 11, the laminations of the second core 14 are assembled to the electrical winding in a similar manner.

Magnetic cores constructed in accordance with the present invention exhibit remarkable uniformity in shape, weight, and electrical characteristics. The corner bends in all the laminations 15 of the finished core are nested together, and the locating holes 16 in all the laminations are in alignment and disposed in a common plane intersecting the axis (not shown) through the core window about which the laminations are concentrically stacked, said common plane being coincident with a medial plane through the core. The overlapped ends of each lamination 15 forming a lap joint 17 are disposed on opposite sides of said medial plane and arranged symmetrically relative thereto. Whereas magnetic cores of approximately one hundred pounds weight constructed in accordance with prior art methods occasionally varied as much as from 10 to 15 pounds in weight; in one lot of 320 cores constructed in accordance with the present invention, the maximum variation in weight was less than two pounds and the average weight of the cores which had been theoretically calculated to be 39 pounds was measured to be 38.6 pounds. This consistency in core weight, shape, and electrical characteristics permits working the steel at considerably higher magnetic flux densities and thus also permits reduction in the amount of steel, the weight and the size of the core in comparison to magnetic cores constructed in accordance with prior art methods.

The method of the invention also provides a considerably lower destruction factor than prior art methods of magnetic core construction. Destruction factor is the difference between the power consumption in electrical steel when subjected to alternating current magnetization after final assembly in the core and coil assembly and in its original strain relief annealed condition. Destruction factor is calculated by measuring core loss in the steel in an Epstein test before the steel is fabricated into laminations and also measuring the core loss in the finished electrical transformer and subtracting the former from the latter. Destruction factor gives an indication of the efficiency of the method of transformer construction, and a low destruction factor signifies that the magnetic material of the finished transformer is substantially free of strains deleterious to its magnetic properties. The destruction factor of the method of construction of the present invention is considerably lower than that of any other method of which applicants are aware for constructing magnetic cores of individual closed magnetic circuits with a single lap joint in each magnetic circuit.

Although the invention has been illustrated and described as covering magnetic cores with aligned lap joints in one of the yokes of the core, the invention is not so limited and magnetic cores may be constructed in accordance with the method of the invention with the lap joints in alignment in either a winding leg or a yoke, or with the lap joints staggered peripherally in a step-like flight of joints in any core leg as disclosed in U.S. patent application Serial No. 353,397 to Dornbush, having the same assignee as the subject invention. Further, although the invention has been illustrated and described as embodying variation in length between successive laminations, it will be apparent that the invention also comprehends the provision of lamination "sets" of progressively different length where each "set" includes a plurality of equal length laminations, and it is intended in the appended claims that "laminations of progressively different lengths" cover this alternative arrangement wherein laminations of the same length comprise a "set" and the ends of each lamination are overlapped.

Although only the preferred method of constructing a magnetic core and a specific embodiment of novel apparatus particularly adapted for cold forming corner bends in the core laminations during the process of core construction have been illustrated and described, it will be apparent to those skilled in the art that many modifications and alterations may be made therein without departing from the invention, and we intend in the appended claims to cover all such modifications and variations as fall within the true spirit and scope of the invention.

What we claim as new and desire to secure by Letters Patent of the United States is:

1. The method of constructing a rectangular magnetic core of whole turn laminations having overlapped ends comprising the steps of providing a plurality of magnetic strip laminations of progressively different lengths each of which is longer by approximately the amount of overlap of said lamination ends than the perimeter of the finished core at the layer containing said lamination, superimposing said laminations substantially symmetrically in a stack in order of their progressively different lengths, flatwise bending said stack of laminations through obtuse angles at points corresponding to the four corners of the finished core, whereby at least certain of said laminations assume a set with four bends therein, concentrically stacking said laminations into a closed hollow core of individual whole turns each comprising at least one lamination with the bends in said laminations in generally radial alignment and with the respective ends of each whole turn in overlapping relation to one another in one side of said core between adjacent bends defining said one side, shaping said core into rectangular configuration, and strain relief annealing said core while so shaped.

2. The method of constructing a rectangular magnetic core of whole turn laminations having overlapped ends comprising the steps of providing a plurality of magnetic strip laminations of progressively different lengths each having a length greater by approximately the amount of overlap of said lamination ends than the perimeter of the finished core at the layer including said lamination, superimposing said laminations substantially symmetrically in a stack in order of their progressively different lengths, positioning said stack of laminations adjacent one shorter side of an elongated four-sided mandrel having a pair of opposed concave sides and a pair of opposed relatively shorter sides and having acute angle corners between said sides with the shortest lamination contiguous said shorter side and flatwise bending said stack in conformity with the outer periphery of said mandrel to provide bends in at least the laminations nearest said mandrel at the portions adjacent the four corners of said mandrel, securing the ends of the longest lamination in overlapping relation, successively inserting said laminations in order of their progressively different lengths within said longest lamination with the bends in said laminations in generally radial alignment and the respective ends of each lamination length in overlapping relation to each other along one side of the hollow core formed by said laminations and between the bends defining said one side, expanding said core by mechanical force into rectangular configuration, and strain relief annealing said laminations while so shaped.

3. The method of constructing a rectangular magnetic core of whole turn laminations having overlapped ends comprising the steps of providing a plurality of magnetic strip laminations of progressively different lengths each having a length greater by approximately the amount of overlap of said lamination ends than the perimeter of the finished core at the layer including said lamination, superimposing said laminations substantially symmetrically in a stack in order of their progressively different lengths, positioning the central portion of said stack adjacent one shorter side of an elongated quadrilateral mandrel having a pair of opposed concave sides and a pair of opposed relatively shorter sides and having acute angle corners between said sides so that the shortest lamination of said stack is substantially symmetrically aligned with respect to the longitudinal axis of said mandrel, applying pressure against said stack in a direction generally parallel to the longitudinal axis of said mandrel to flatwise bend said laminations into U-shape around said mandrel, applying pressure against said stack in a direction generally perpendicular to said longitudinal axis and in the plane defined by said opposed concave and opposed shorter sides to bend said stack in conformity with said concave sides and concurrently applying pressure against the ends of said stack in sequence in a direction generally perpendicular to said longitudinal axis and in said plane to bend the ends of said stack in conformity with the other shorter side of said mandrel, whereby at least the laminations adjacent said mandrel assume permanent bends corresponding to the four corners of said mandrel, securing the ends of the longest lamination in overlapping relation to each other, successively inserting said laminations in order of their progressively different lengths within said longest lamination with the bends in said laminations nested together and with the respective ends of each lamination length in overlapping relation to one another along one side of the closed, hollow core formed by said laminations and between the bends defining said one side, expanding said core by mechanical force into rectangular configuration, and strain-relief annealing said core while so shaped.

4. The method of constructing a closed rectangular magnetic core of whole turn laminations having overlapped ends comprising the steps of providing a plurality of magnetic strip laminations of progressively different lengths each of which is longer by approximately the amount of overlap of said lamination ends than the perimeter of the finished core at the layer containing said lamination, superimposing said laminations substantially symmetrically in a stack in order of their progressively different lengths positioning said stack of laminations adjacent one shorter side of an elongated quadrilateral mandrel having acute angle corners between at least certain of the sides thereof so that the shortest lamination is contiguous said mandrel and flatwise bending said stack in conformity with the contour of said mandrel to provide corner bends in at least the laminations nearest said mandrel, overlapping the respective ends of each lamination length to form a closed four-sided core with lap joints in one side of said core between adjacent corner bends defining said one side, and strain-relief annealing said core with the ends of the lamination lengths so overlapped.

5. The method of constructing a closed magnetic core of whole turn laminations having overlapped ends comprising the steps of providing a plurality of magnetic strip laminations of progressively different lengths each of which is longer by approximately the amount of overlap of said lamination ends than the perimeter of the finished core at the layer containing said lamination, superimposing said laminations substantially symmetrically in a stack in order of their progressively different lengths, positioning said stack of laminations adjacent one shorter side of an elongated four-sided mandrel having a pair of opposed longer sides and a pair of opposed relatively shorter sides so that the shortest lamination of said stack is substantially symmetrically aligned with respect to the longitudinal axis of said mandrel, applying pressure against said stack of laminations in a direction generally parallel to the longitudinal axis of said mandrel to flat-wise bend said stack of laminations into U-shape around said mandrel and provide a pair of corner bends in at least the laminations adjacent said mandrel, applying pressure against said stack of laminations in a direction generally perpendicular to said longitudinal axis and in the plane defined by said opposed longer sides and said opposed shorter sides to bend said stack in conformity with the other shorter side of said mandrel and provide a second pair of corner bends in at least the laminations adjacent said mandrel, overlapping the ends of the laminations to form a closed four-sided core of individual whole turns each including at least one lamination and having a single lap joint in one side of said core between adjacent corner bends defining said one side, and strain-relief annealing said core with the ends of the laminations so overlapped.

6. The method of constructing a rectangular magnetic core of whole turn laminations having overlapped ends comprising the steps of providing a plurality of magnetic strip laminations of progressively different lengths each of which is longer by approximately the amount of overlap of said lamination ends than the perimeter of the finished core at the layer containing said lamination, superimposing said laminations substantially symmetrically in a stack in order of their progressively different lengths, positioning said stack of laminations adjacent one shorter side of an elongated quadrilateral mandrel having acute angle corners between the sides thereof so that the shortest lamination is adjacent said mandrel and flatwise bending said stack of laminations in conformity with the contour of said mandrel to provide corner bends in at least the laminations nearest said mandrel, concentrically stacking said laminations into a closed hollow core of individual whole turns each comprising at least one lamination with the bends in said laminations nested together and with the respective ends of each whole turn in overlapping relation to one another in one side of said core between adjacent bends defining said one side, shaping said core to rectangular configuration, and strain-relief annealing said core while so shaped.

7. The method of constructing a rectangular magnetic core of whole turn laminations having overlapped ends comprising the steps of providing a plurality of magnetic strip laminations of progressively different lengths each of which is longer by approximately the amount of overlap of said lamination ends than the perimeter of the finished core at the layer containing said lamination, superimposing said laminations substantially symmetrically in a stack in order of their progressively different lengths, positioning said stack of laminations adjacent one shorter side of an elongated four-sided mandrel having a pair of opposed concave sides and a pair of opposed relatively shorter sides and having acute angle corners between said sides so that the shortest lamination of said stack is substantially symmetrically aligned with respect to the longitudinal axis of said mandrel, applying pressure against said stack of laminations in a direction generally parallel to the longitudinal axis of said mandrel to flatwise bend said laminations into U-shape around said mandrel, applying pressure against said stack of laminations in a direction generally perpendicular to said longitudinal axis and in the plane defined by said opposed concave sides and said opposed shorter sides to complete the flatwise bending of said laminations in conformity with the outer periphery of said mandrel, concentrically assembling said laminations into a closed hollow core of individual whole turns each comprising at least one lamination with the respective ends of each whole turn in overlapping relation to each other along one side of said core between adjacent bends in said laminations, shaping said core to rectangular configuration, and strain-relief annealing said core while so shaped.

8. The method of constructing a rectangular magnetic core of whole turn laminations having overlapped ends comprising the steps of providing a plurality of magnetic strip laminations of progressively different lengths each having a length greater by approximately the amount of overlap of said lamination ends than the perimeter of the finished core at the layer including said lamination, superimposing said laminations substantially symmetrically in a stack in order of their progressively different lengths, flatwise bending said stack of laminations through obtuse angles at points corresponding to the corners of the finished core, whereby at least certain of said laminations are set with four corner bends therein, securing the ends of the longest lamination in overlapping relation, successively inserting said laminations in order of their progressively different lengths within said longest lamination with the corner bends in said laminations in generally radial alignment and with the respective ends of each lamination length in overlapping relation to one another along one side of the closed hollow core formed by said laminations and between the corner bends defining said one side, expanding said core by mechanical force into rectangular configuration, and strain-relief annealing said core while so shaped.

9. The method of constructing a closed rectangular magnetic core of whole turn laminations having overlapped ends comprising the steps of providing a plurality of magnetic strip laminations of progressively different lengths each of which is longer by approximately the amount of overlap of said lamination ends than the perimeter of the finished core at the layer containing said lamination, forming a locating hole in each of said laminations, superimposing said laminations substantially symmetrically in a stack in order of their progressively different lengths with the locating holes in all of said laminations in register, inserting a locating pin through the locating holes in all of said laminations, disposing said stack adjacent one shorter side of an elongated four-sided mandrel having a pair of longer sides and a pair of shorter sides on respectively opposite sides thereof so that the shortest lamination of said stack is substantially symmetrically aligned with respect to the longitudinal axis of said mandrel, flatwise bending said stack of laminations in conformity with the contour of said mandrel to form corner bends in at least the laminations nearest said mandrel, overlapping the ends of the laminations while said locating pin is extending through said registering locating holes and said corner bends in said laminations are in general radial alignment to form a closed four-sided core with lap joints in one side of said core between corner bends defining said one side, and strain-relief annealing said core with the ends of the laminations so overlapped.

10. The method of constructing a rectangular magnetic core of whole turn laminations having overlapped ends comprising the steps of providing a plurality of magnetic strip laminations of progressively different lengths each having a length greater by approximately the amount of overlap of said lamination ends than the perimeter of the finished core at the layer including said lamination, forming a locating hole in each of said laminations, superimposing said laminations substantially symmetrically in a stack in order of their progressively different lengths with the locating holes in all of said laminations in alignment, positioning said stack adjacent one shorter side of an elongated four-sided mandrel having a pair of opposed concave sides and a pair of opposed relatively shorter sides one of which is provided with an aperture adapted to accommodate said locating pin so that the shortest lamination of said stack is substantially symmetrically aligned with respect to the longitudinal axis of said mandrel, inserting said locating pin through the aligned locating holes in all of said laminations and into said aperture, applying pressure against said stack of laminations in a direction parallel to the longitudinal axis of said mandrel to flatwise bend said stack of laminations in U-shape around said mandrel, applying pressure against said stack of laminations in a direction perpendicular to said longitudinal axis and in the plane defined by said opposed concave sides and said opposed shorter sides to bend said stack in conformity with said concave sides and concurrently applying pressure against the ends of the stack in sequence in a direction perpendicular to said longitudinal axis and in said plane to bend the ends of the stack in conformity with the other shorter side of said mandrel, concentrically stacking said laminations into a closed hollow core of individual whole turns each comprising at least one lamination with the bends in said laminations nested together and with the respective ends of each whole turn in overlapping relation to one another along one side of said core between adjacent bends in said laminations, shaping said core to rectangular configuration, and strain-relief annealing said core while so shaped.

11. The method of constructing a rectangular magnetic core of whole turn laminations having overlapped ends comprising the steps of providing a plurality of magnetic strip laminations of progressively different lengths each having a length greater by approximately the amount of overlap of said lamination ends than the perimeter of the finished core at the layer including said lamination, forming a locating hole through each of said laminations midway of the ends thereof, superimposing said laminations substantially symmetrically in a stack in order of their progressively different lengths with the locating holes in all of said laminations in alignment, positioning said stack adjacent one shorter side of an elongated four-sided mandrel having a pair of opposed concave sides and a pair of opposed relatively shorter sides and having acute angle corners between said sides so that the shortest lamination of said stack is contiguous said mandrel and substantially symmetrically aligned with respect to the longitudinal axis of said mandrel, said one shorter side having an aperture therein, inserting a locating pin through the aligned locating holes in all of said laminations and into said aperture, applying pressure against said stack of laminations in a direction parallel to the longitudinal axis of said mandrel to flatwise bend said stack of laminations in U-shape around said mandrel, applying pressure against said stack of laminations in a direction perpendicular to said longitudinal axis and in the plane defined by said opposed concave sides and said opposed shorter sides to bend said stack in conformity with said concave sides and concurrently applying pressure against the ends of the stack in sequence in a direction perpendicular to said longitudinal axis and in said plane to bend the ends of said stack in conformity with the other shorter side of said mandrel, whereby at least the laminations adjacent said mandrel assume a permanent bend at the four corners of said mandrel, securing the ends of the longest lamination in overlapping relation, inserting said locating pin through the locating hole in said longest lamination, assembling said laminations successively in order of their progressively different lengths within said longest lamination so that the locating hole in each lamination receives said locating pin and the bends in said laminations are nested together and concurrently overlapping the respective ends of each lamination length along one side of the core between the bends defining said one side, expanding said core by mechanical force into rectangular configuration, and annealing said core while so shaped.

12. The method of constructing a rectangular magnetic core of whole turn laminations having overlapped ends comprising the steps of providing a plurality of magnetic strip laminations of progressively different lengths each having a length greater by approximately the amount of overlap of said lamination ends than the perimeter of the finished core at the layer including said lamination, forming a locating hole in each of said laminations, superimposing said laminations substantially symmetrically in a stack in order of their progressively different lengths with the locating holes in all of said laminations in alignment, positioning said stack of laminations adjacent one shorter side of an elongated quadrilateral mandrel having a pair of opposed longer sides and a pair of opposed relatively shorter sides so that the shortest lamination of said stack is contiguous said mandrel and substantially symmetrically aligned with respect to the longitudinal axis of said mandrel, said one shorter side having an aperture therein, inserting a locating pin through the aligned locating holes of all of said laminations and into said aperture, applying pressure against said stack in a direction generally parallel to the longitudinal axis of said mandrel to bend said stack into U-shape about said mandrel and subsequently applying pressure against said stack in a direction perpendicular to said longitudinal axis and in the plane defined by said opposed longer sides and said opposed shorter sides to bend the ends of said stack in conformity with the other shorter side of said mandrel, overlapping the ends of the laminations while said locating pin is extending through said aligned locating holes to form a closed four-sided core with lap joints in one side of said core, shaping said closed core to rectangular configuration, and strain-relief annealing said core while so shaped.

13. Apparatus adapted to cold-form a stack of progressively different length magnetic strip laminations for a stationary induction apparatus rectangular magnetic core having whole turn laminations with overlapped ends into approximately rectangular contour, comprising, in combination, an elongated four-sided mandrel having a pair of opposed concave sides and a pair of opposed relatively shorter sides and having acute angle corners between said sides, the perimeter of said mandrel being less than the length of the shortest of said laminations by approximately the amount of overlap between the ends of each of said laminations in said magnetic core, bending elements disposed laterally of said concave sides, said mandrel and said elements being relatively movable in a direction longitudinally of said mandrel, to bend said stack adjacent said concave sides when said stack is positioned between said mandrel and said elements with the central portion of said stack opposite one of said shorter sides of said mandrel, first pressure applying means disposed laterally of said concave sides and being movable relative to said mandrel in a direction perpendicular to the longitudinal axis of said mandrel and in the plane defined by said opposed concave sides and said opposed shorter sides to bend said stack in conformity with said concave sides subsequent to the bending of said stack upon relative movement between said mandrel and said bending elements, and second pressure applying means disposed laterally of said concave sides and movable in sequence relative to said mandrel in a direction perpendicular to said longitudinal axis and in said plane to bend the ends of said stack in embracing relation to the other of the shorter sides of said mandrel.

14. Apparatus adapted to cold-form a stack of magnetic strip laminations of progressively different lengths for a stationary induction apparatus rectangular magnetic core of whole turn laminations having overlapped ends into approximate rectangular contour, comprising, in combination, an elongated four-sided mandrel having a pair of opposed concave sides and a pair of opposed relatively shorter sides and having acute angle corners between said sides, the perimeter of said mandrel being less than the length of the shortest lamination of said stack by approximately the amount of overlap between said overlapped ends, one of the shorter sides of said mandrel having an aperture therein, bending elements disposed laterally of said concave sides, a locating pin adapted to be inserted through locating holes provided in said laminations midway of the ends thereof and into said aperture when said stack is positioned between said mandrel and said bending elements with the central portion of the stack opposite said one of said shorter sides and with the shortest lamination adjacent said one shorter side said mandrel and said bending elements being movable relative to each other longitudinally of said mandrel, to bend said stack adjacent said concave sides, first pressure applying means disposed laterally of said concave sides and being movable relative to said mandrel in a direction perpendicular to the longitudinal axis of said mandrel and in the plane defined by said opposed concave sides and said opposed shorter sides to bend said stack in conformity with said concave sides subsequent to the bending of said stack upon relative movement between said mandrel and said bending elements, and second pressure applying means disposed laterally of said concave sides and movable in sequence relative to said mandrel in a direction perpendicular to said longitudinal axis and in said plane to bend the ends of said stack in embracing relation to the other of the shorter sides of said mandrel.

15. Apparatus adapted to cold-form a stack of magnetic strip laminations of progressively different lengths for a rectangular magnetic core of whole turn laminations having overlapped ends into approximate rectangular contour, comprising, in combination, an elongated four-sided mandrel having a pair of opposed concave sides and a pair of opposed relatively shorter sides and having acute angle corners between said sides, the perimeter of said mandrel being less by approximately the amount of overlap between said lamination ends than the length of the shortest lamination of said stack, one of the shorter sides of said mandrel having an aperture therein, bending elements disposed laterally of said concave sides, a locating pin adapted to be inserted through locating holes provided in said laminations midway of the ends thereof and into said aperture when said stack is positioned between said mandrel and said bending elements with the central portion of the stack opposite said one of said shorter sides and with the shortest lamination contiguous said one shorter side, said mandrel and said bending elements being movable relative to each other longitudinally of said mandrel, to bend said stack adjacent said concave sides, a first pair of fluid cylinders disposed laterally of said concave sides and on opposite sides of the longitudinal axis of said mandrel, a second pair of fluid cylinders disposed laterally of said concave sides and on opposite sides of the longitudinal axis of said mandrel, each of said fluid cylinders including a piston movable therein and carrying a pressure applying shoe, each cylinder of said first pair being adapted to move its piston and pressure applying shoe in a direction perpendicular to said longitudinal axis to bend said stack in conformity with one of said concave sides subsequent to the bending of said stack upon relative movement between said mandrel and said bending elements, the cylinders of said second pair being independently operable to move their pistons and pressure applying shoe sequentially in a direction perpendicular to said longitudinal axis to bend the ends of said stack in embracing relation to the other of the shorter sides of said mandrel.

16. Apparatus adapted to form a stack of magnetic strip laminations for a stationary induction apparatus rectangular magnetic core of whole turn laminations having overlapped ends into approximate rectangular contour, comprising, in combination, an elongated four-sided mandrel having a pair of opposed longer sides and a pair of opposed relatively shorter sides, the perimeter of said mandrel being less by approximately the amount of overlap between said lamination ends than the length of the shortest lamination of said stack, a pair of bending elements disposed laterally of said longer sides, said mandrel and said bending elements being movable relative to each other in a direction parallel to the longitudinal axis of said mandrel to bend said stack in U-shape adjacent said longer sides when said stack is positioned between said mandrel and said bending elements with the central portion of said stack opposite one of the shorter sides of said mandrel and the shortest lamination disposed adjacent said one shorter side, and pressure applying means disposed laterally of said longer sides and movable toward said mandrel in a direction perpendicular to said longitudinal axis and in the plane defined by said opposed longer sides and said opposed shorter sides to bend the ends of said stack in embracing relation to the other of the shorter sides of said mandrel.

17. Apparatus adapted to form a stack of magnetic strip laminations for a stationary induction apparatus magnetic core of whole turn laminations having overlapped ends into approximate rectangular contour, comprising, in combination, an elongated four-sided mandrel having a pair of opposed longer sides and a pair of opposed relatively shorter sides, the perimeter of said mandrel being less by approximately the amount of overlap between said lamination ends than the length of the shortest lamination of said stack, one of said shorter sides of said mandrel having an aperture therein, bending elements disposed laterally of said longer sides, a locating pin adapted to be inserted through locating holes provided in said laminations midway of the ends thereof and into said aperture when said stack is disposed between said mandrel and said elements with the central portion thereof opposite said one of said shorter sides and with the shortest lamination adjacent said one shorter side, said mandrel and said bending elements being movable relative to each other in a direction parallel to the longitudinal axis of said mandrel to bend said stack adjacent said longer sides, and pressure applying means disposed laterally of said longer sides and movable in sequence relative to said mandrel in a direction perpendicular to said longitudinal axis and in the plane defined by said opposed longer sides and said opposed shorter sides to bend the ends of said stack in embracing relation to the other of the shorter sides of said mandrel.

18. Apparatus adapted to form a stack of magnetic strip laminations of progressively different lengths for a stationary induction apparatus magnetic core of whole turn laminations having overlapped ends into approximately rectangular configuration, comprising, in combination, an elongated four-sided mandrel having a pair of opposed concave sides and a pair of opposed relatively shorter sides, the perimeter of said mandrel being less by approximately the amount of overlap of said lamination ends than the length of the shortest of said laminations, a plurality of pressure applying means, each pressure applying means including a pair of members disposed laterally of said concave sides and on opposite sides of the longitudinal axis of said mandrel, said mandrel and one of said pressure applying means being movable relative to each other in a direction parallel to the longitudinal axis of said mandrel to bend said stack adjacent said concave sides when said stack is positioned between said mandrel and said one of said pressure applying means with the central portion of stack opposite one of the shorter sides of said mandrel and the shortest lamination contiguous said one shorter side, said mandrel and other pressure applying means being movable relative to each other in a direction perpendicular to said longitudinal axis and in the plane defined by said opposed concave sides and said opposed shorter sides to bend said stack in conformity with said concave sides and in embracing relationship to the other of said shorter sides of said mandrel.

19. Apparatus adapted to form a stack of magnetic strip laminations of progressively different lengths for a stationary induction apparatus magnetic core of whole turn laminations having overlapped ends into approximately rectangular contour, comprising, in combination, a pair of spaced apart pressure applying members, an elongated four-sided mandrel having a pair of opposed concave sides and a pair of opposed relatively shorter sides and having a perimeter less than the length of the shortest lamination of said stack by approximately the amount of overlap between the ends of said laminations and being movable longitudinally of its axis relative to said pressure applying members and in a path between said members, to bend said stack laterally adjacent said concave sides when said stack is disposed between said mandrel and said members with the central portion of the stack opposite one of said shorter sides and with the shortest lamination contiguous said one shorter side, pressure applying means positioned adjacent said concave sides subsequent to the bending of said stack and movable in a direction perpendicular to the axis of said mandrel and in the plane defined by said opposed concave sides and said opposed shorter sides to bend said stack into conformity with said concave sides, said pressure applying members being movable in sequence in a direction perpendicular to the longitudinal axis of said mandrel and in said plane to bend the ends of said stack in embracing relation to the other of said shorter sides.

References Cited in the file of this patent

UNITED STATES PATENTS

| | | |
|---|---|---|
| Re. 23,987 | Seften et al. | Apr. 26, 1955 |
| 296,269 | Beaman | Apr. 1, 1884 |
| 469,952 | Singer | Mar. 1, 1892 |
| 1,285,996 | Hensley | Nov. 26, 1918 |
| 1,443,737 | Gibson | Jan. 20, 1923 |
| 1,933,140 | Gakle | Oct. 31, 1933 |
| 1,936,611 | Young | Nov. 28, 1933 |
| 2,456,457 | Somerville | Dec. 14, 1948 |
| 2,489,625 | Dornbush | Nov. 29, 1949 |
| 2,494,349 | Mittermaier | Jan. 10, 1950 |
| 2,513,164 | Genua | June 27, 1950 |
| 2,523,071 | Somerville | Sept. 19, 1950 |
| 2,595,820 | Somerville | May 6, 1952 |
| 2,702,936 | Hurt | Mar. 1, 1955 |

FOREIGN PATENTS

| | | |
|---|---|---|
| 25,513 | Germany | Jan. 29, 1884 |